United States Patent Office 2,927,860
Patented Mar. 8, 1960

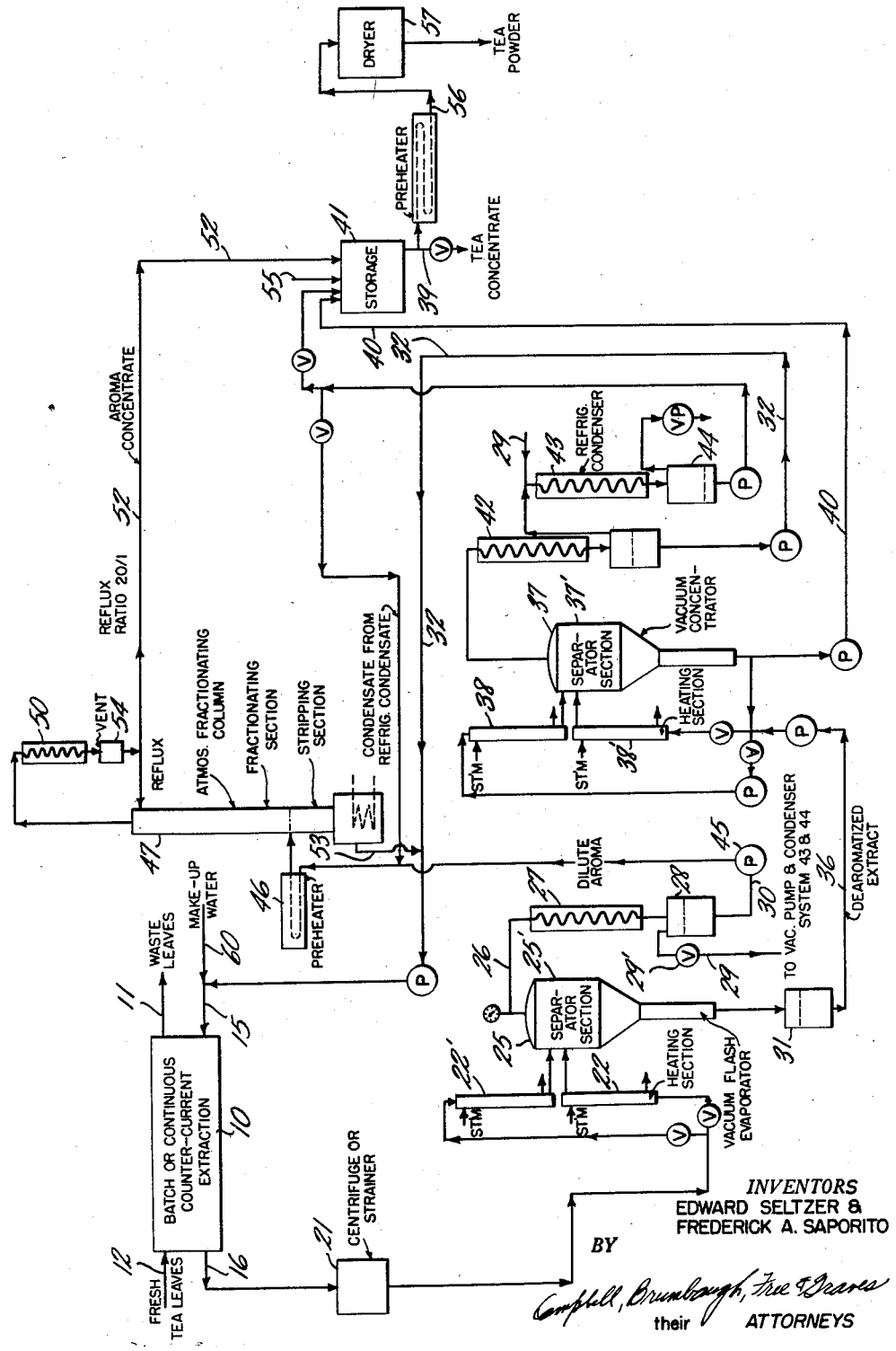

2,927,860
METHOD OF MAKING A TEA EXTRACT

Edward Seltzer, Teaneck, N.J., and Frederick A. Saporito, Franklin Square, N.Y., assignors to Thomas J. Lipton, Inc., Hoboken, N.J., a corporation of Delaware Application February 13, 1956, Serial No. 565,004

10 Claims. (Cl. 99—77)

This invention relates to tea concentrates and powders.

In preparing tea concentrates and powders, it has been the practice to produce an aqueous extract of the tea and then to subject the extract to evaporation to obtain the concentrate or powder. Such practice has resulted in a product of inferior quality in that beverages prepared therefrom do not have the full flavor and aroma of freshly brewed tea.

It has been found that such inferior quality is primarily due to one or both of two actions which may occur during the preparation of the concentrate or powder. First, volatile aromatic ingredients, which are important in providing full flavor and aroma, escape during evaporation, and, second, non-aromatic ingredients, which are also important in providing flavor to the beverage, are degraded during the process of evaporation as a result of the relatively high temperatures to which the extract is subjected.

An object of the invention is to provide a method for concentrating a tea extract which will prevent loss of the aromatic ingredients and permit the concentration and recovery of the non-aromatic flavor-producing ingredients without substantial degradation in quality.

Another object of the invention is to produce a tea concentrate or powder having the aroma and flavor of freshly brewed tea.

These and other objects and advantages of the invention will appear from the following description.

It has been discovered that by carrying out the separation of the aroma from the tea extract under vacuum thereby effecting such evaporation at relatively low temperatures and then concentrating the distillate or condensate under atmospheric pressure, losses of aromatic materials may be greatly reduced while the flavor of the finished product remains substantially unimpaired. Loss of aromatic materials may be further reduced by carrying out the process under conditions which minimize the amount of noncondensible gases present in the system and by appropriate regulation of the vacuum associated with the evaporation vessel as hereinafter disclosed.

The extract is prepared from tea leaves that have been processed and dried normally at the plantation, according to standard procedures. The tea leaves chosen may be (1) black or fully fermented varieties such as Ceylon, South India or Indonesia, (2) unfermented or green teas such as the Japan pan-fired or China Gunpowder or Young Hyson teas, (3) Oolong (semifermented) teas such as the Formosa variety, or (4) mixtures of several teas. The leaves may be whole, or they may be comminuted even to a powder. The tea extract is prepared with hot water, suitably by batch or continuous countercurrent procedures or by multiple water contacts. The extract may conveniently have at least about 3% by weight of solids soluble in hot water. The concentration of soluble tea ingredients may be as high as the equilibrium concentration at the temperature prevailing in the extractor.

The extract of tea leaves is subjected to flash distillation (evaporation) under vacuum, being fed continuously through a heater where evaporation occurs and then passing to a vapor separation chamber where the vapor fraction is removed. About 5 to 30% by weight of the extract (depending in part upon the type of heater used) is removed from the chamber as vapor. The removed vapor is then condensed and the liquid condensate is withdrawn from the condensate receiver and subjected to fractionation in an aroma fractionating column operated at substantially atmospheric pressure. In carrying out the flash evaporation at reduced pressure, the temperature of the extract is maintained at a relatively low level, thereby to preserve the fresh flavor of the tea and to avoid alterations in the color. In fractionating the Dilute Aroma at atmospheric or slightly higher pressure, the vapor volumes are kept at a minimum and hence the distillation is much simpler and any noncondensible gases which may be present are more easily disposed of without losing aroma.

Various modifications in the method of the invention and in the product obtained thereby will be apparent from the following more detailed description.

The figure is a flow diagram representing one procedure for carrying out the method of the invention.

Reference number 10 indicates a countercurrent extractor to which the liquid extractant is introduced at 15. Tea leaves are introduced to the extractor 10 at 12 and contacted with the extractant at an elevated temperature and for a time sufficient to produce an extract which may have a concentration of about 3% or more of soluble tea solids. The extracted leaves are removed at 11.

The liquid withdrawn from the extractor 10 through pipe 16, designated as "Dilute Extract," may be passed through a strainer 21 to remove suspended tea fines, dust or other extraneous insoluble material, or may be centrifuged for the same purpose. The dilute extract generally contains about 3½ to 5% soluble tea solids. It is then drawn through a jacketed down-flow heater 22' or through an up-flow heater 22 into a vacuum flash evaporator 25, which is maintained at an absolute pressure not greater than about 5 inches of mercury and 100 to 150° F. In the chamber 25' of the evaporator 25 about 5 to 30% of the dilute extract, the amount depending upon whether the up-flow or the down-flow heater is used, is removed and leaves the chamber through pipe 26 and is designated, when condensed, as "Dilute Aroma." It is condensed in the condenser 27 and collected in the vessel 28 which is connected to a vacuum source through a pipe 29.

It has been found that operating with the down-flow heater, a relatively smaller fraction, i.e., only about 5 to 15% of the extract feed, need be evaporated to remove the aroma, as compared with other types of pre-heaters, such as the up-flow pre-heater, which may require the removal of 10 to 30% of the extract. This provides advantages which will appear more clearly from the ensuing description, including simplifying the concentration of the dilute aroma (or providing a more concentrated aroma with the same equipment and operating procedure), decreasing the amount of dilution caused by the addition of the aroma concentrate to the concentrated extract, and reducing the amount of water that must be removed in the drying operation with a resultant improvement in the retention of aroma during drying. It is possible that the superior performance of the down-flow evaporator may be caused by the increased ease with which the volatile aroma escapes from the liquid films formed on the pipe surfaces as the material flows downwardly through the pipe, or in other words by the function of the heater as a falling film type evaporator.

A primary feature of the invention is that the vacuum in the flash evaporation system is maintained primarily by taking advantage of the low vapor pressure of water at the temperature prevailing in the condenser, rather than by exhausting vapors from the evaporator to a vacuum system. The evaporator is preferably operated so that there is little or no vapor or gas withdrawn from it, the small amount withdrawn being only that necessary to maintain the vacuum within the system. Hence, the pipe connecting the evaporator with the vacuum source may be provided with a valve such as valve 29' which, after the vacuum has once been established, is opened only periodically, suitably responsive to the vacuum in the system, for a time interval sufficient to remove non-condensibles that are admitted to the evaporator system inadvertently with the extract feed or through leaks. When the valve is closed, aroma vapors cannot escape to the vacuum source and loss thereof is avoided.

The unevaporated portion of the liquid, designated herein as "De-aromatized Extract," constituting about 70 to 95% of the feed, is collected in a tank 31 or withdrawn at a constant rate with a pump. It may contain, for example, about 4 to 6% solids.

The De-aromatized Extract is fed through a pipe 36 to the vacuum concentrator 37, which may be of any generally known type intended for heat sensitive materials, suitably one which causes evaporation of liquid (in chamber 37') while material is being circulated continuously (from down-flow tubular heater 38 or up-flow heater 38') within it. It may operate, for example, at 25 to 29 inches of Hg vacuum (absolute pressure of about 1 to 5 inches) and 100 to 150° F. A falling film evaporator with or without an internal agitator may be desirable. The effluent of concentrator 37 (Concentrated Extract) contains about 25 to 45% tea solids and flows through pipe 40 to vessel 41. The distillate (primarily water which is deaerated and free of substantially all tea solids) is condensed in a water-cooled condenser, withdrawn, and recycled to the extractor 10 through a pipe 32 to be used as extractant to extract additional quantities of tea. The uncondensed material is passed through a refrigerated condenser 43 before it enters the vacuum system and condensate containing some of the "high notes" of the aroma is collected in the vessel 44 from which (if it has a high aroma content) it may be returned to the storage vessel 41 or through the piping to the fractionating column 47 which is used to concentrate the Dilute Aroma or if it has a low aroma content, it may be combined with other condensates for use as an extraction solvent.

The Dilute Aroma flowing through the pipe 30 is pumped at a constant rate through a pre-heater or vaporizer 46 and is introduced at an intermediate point of the fractionating column 47, which is heated at the base. Liquid flowing down the lower section of the column is stripped by rising vapors from the reboiler at the bottom. The overhead vapors are condensed at 50. Most of the condensate collected in vessel 54 is returned to the top of the column as reflux through a pipe 51, and the remainder, which is designated as "Aroma Concentrate," flows through a pipe 52 and is mixed with the concentrated Dearomatized Extract in the vessel 41. The amount of condensate returned to the column 47 as reflux may be 50 to 99% of the total, while the amount of Aroma Concentrate is about ½ to 1% of the original Dilute Extract fed to the heater 22 or 22', the lesser amount being more readily obtainable when the down-flow heater 22' is employed.

The liquid flowing from the base of the column 47 through the pipe 53 has been stripped substantially free of volatile ingredients including noncondensible gases and hence is substantially pure deaerated water. This water may contain some aromatic "low notes" that are difficult to remove by fractionating at atmospheric pressure. It may be combined with the liquid effluent of the condenser 42 and returned to the extractor 10 to be used again as extractant, thereby conserving the low notes and utilizing the deaerated water for the purposes heretofore indicated, i.e., to minimize the amount of non-condensible gases in the vacuum flash evaporator.

The mixture of Aroma Concentrate and Concentrated Extract may be used as such to produce tea beverages having superior aroma, in which case it may be withdrawn from the tank 41 through the pipe 39. However, it is optional, according to the invention, to produce a dry powder by spray drying according to the procedure now to be described, or by other types of drying procedure such as may be described or expedient.

Optionally, through a pipe 55 there may be added to the tank 41 an amount of carbohydrate syrup or powder, such as clear, non-sweet (low percentage dextrose equivalent) corn syrup solids, in an amount that will be effective to retain in the tea powder the desirable aroma during the subsequent spray drying operation, or to improve the wettability and solubility of the tea powder in water. For effective retention of aroma during spray drying, the amount of soluble tea solids should be at least about 25% by weight of the feed to the dryer. An amount of corn syrup solids equal to the tea solids is preferably used, and in a 25% tea solids concentrate this will raise the total solids concentration to about 37% after the dilution caused by the addition of the Aroma Concentrate. The temperature of the liquid entering the spray dryer is preferably about 110 to 150° F., the liquid being pre-heated to this temperature if necessary.

The liquid is introduced to the spray dryer 57 through a pipe 56. An atomizer designed to disperse the liquid to small droplets, in accordance with known spray drying techniques, is employed. The air temperature in the dryer may be, for example, 300 to 500° F. at the inlet to the drying chamber and 200 to 300° F. at the outlet. The product of the spray dryer is a free-flowing powder which can be reconstituted by addition of water to produce beverage tea having substantially improved aroma as compared with previously known tea powders.

As previously disclosed, the water which is withdrawn from the aroma fractionating column at 53 and from the extract concentrating column at 32 are recycled and re-used as extractant in extractor 10.

It will be noted, therefore, that the system is cyclic in nature, in that the only water leaving it, apart from that which may be lost by evaporation, is that in the combined concentrated aroma and extract through pipe 56 and that in the waste tea leaves at 11. Any of the desirable ingredients of the tea which might be present in the effluents are conserved. Moreover, those effluents are already deaerated by virtue of having been subjected to distillation and hence possess the desirable property of freedom from noncondensible gases which would cause difficulties in operation of the vacuum flash evaporator. Such combined effluents have the further advantages of possessing "low notes" of aroma previously mentioned, but are lacking in undesirable minerals and dissolved or suspended solids such as iron which may be present in fresh water. The "low notes" of aroma must eventually concentrate in the tea concentrate and thereby enrich the final product. The recycle water constitutes about 70 to 85% of the total extractant added at 15. The make-up water added to the system through pipe 60 to account for that lost at the points previously stated constitutes the balance, or about 15 to 30% of the total. The make-up water may be treated to remove dissolved and suspended minerals as well as air and other noncondensibles in apparatus not shown.

Following is an example illustrating one procedure for carrying out the invention.

Example 1

Twelve parts by weight of Ceylon tea leaves are extracted using a countercurrent technique with 83 parts of recycled by-product water from previous operation and 33 parts of make-up water. The temperature of the extraction is 170 to 212° F. and the extract contains 3.9% soluble tea solids, which is about 85 to 95% of the total extractable solids present in the tea. The extract is strained to remove insoluble solids such as bits of leaf and sediment or tea fines. The extract is fed, preferably while hot, to a single-pass stripping still or evaporator, operated under a vacuum of about 25″ of mercury at a temperature of 135° F. in the vapor separator section. The vapor produced, which is about 18.5 parts per 100 parts of Dilute Extract and is designated as Dilute Aroma, is condensed and collected in a receiver. To the vapor space above the liquid in the receiver there is connected a vacuum line having in it a control valve adapted to open and close to maintain the desired vacuum in the flash evaporator. The valve is kept in the closed position most of the time and opened only when necessary to reduce the absolute pressure as desired. The escape of aroma to the vacuum source is thereby minimized.

The unvaporized liquid amounting to about 80 parts and designated as Dearomatized Extract, is withdrawn from the vapor separator section of the evaporator through a pump. It contains about 4.8% soluble tea solids. It is fed to an up-flow vacuum concentrator still operated under a vacuum of about 27″ of mercury at 122° F. in the vapor separation section. The process liquid in the still recirculates through it and through its reboiler by natural or forced circulation. To eliminate foaming, a small amount of an anti-foam agent may be added to the still. The amount of concentrated extract recovered is about 13 parts and contains about 25% solids. The vapors withdrawn are passed through a water-cooled condenser, and the water condensate in the amount of 66 parts is recycled to the extractor. The vapors uncondensed in the water-cooled condenser are passed through a refrigerated condenser. The liquid collected is fed to the column fractionating the Dilute Aroma, and the uncondensed gases are withdrawn into the vacuum system.

The Dilute Aroma is pre-heated or vaporized and introduced at an intermediate point of an aroma fractionating column operated at substantially atmospheric pressure. The overhead vapors are condensed and 95% is added back continuously as reflux to the top of the column, and heat is applied to the reboiler at the bottom of the column in amount sufficient to strip aroma from the liquid flowing down the column. The Concentrated Aroma in the amount of 1.2 parts is recovered and combined with the Concentrated Extract. The bottoms withdrawn from the aroma concentration column (17 parts) which is substantially free of non-condensible gases is recycled to the extractor together with the extract concentrator condensate.

To the combined concentrated aroma and extract there is added an amount of corn syrup solids equal to the tea solids in the extract, i.e., 3.3 parts, thereby to produce a solution of about 37% solids content after the addition of the Aroma Concentrate. The latter is preheated to 110 to 130° F. and fed to the spray dryer at a temperature of 110 to 150° F. The inlet temperature of the dryer air is 438 to 441° F. and the outlet temperature is 218 to 225° F. A free-flowing powdered tea product (approximately 6.5 parts) is recovered. The tea powder, or the mixture of Concentrated Extract and Concentrated Aroma, when reconstituted to beverage tea strength with water, has aroma and flavor which are comparable to those of freshly brewed tea.

Example 2

The procedure described in Example 1 is repeated, using 12 parts of South India black tea leaves instead of Ceylon black tea, and 91 parts of recycled by-product water and 25 parts of make-up water. The temperature of the extraction is 165 to 212° F. The performance of the extractor and the amount of product obtained are substantially the same as described in Example 1. The extract is fed, preferably while hot, to an aroma stripping evaporator which is operated under a vacuum of 27 inches of mercury with an effluent temperature of 115° F. Except for the pressure and temperature, the evaporator is operated under conditions like those described in Example 1, i.e., restricting to a minimum the time during which the evaporator is connected with the vacuum source. Substantially the same amounts of Dilute Aroma and De-aromatized Extract are produced as the amounts stated in Example 1. The De-aromatized Extract is fed to a downflow vacuum concentrator still (provided with a vertical agitator) operated under a vacuum of about 27 inches of mercury at 122° F. in the vapor separator section. The amount of Concentrated Extract recovered is about 8 parts and contains about 40% soluble tea solids. The vapors withdrawn from the concentrator are treated as described in Example 1, e.g., the condensate, 71 parts, is recycled to the extractor. The Dilute Aroma is concentrated as described in Example 1 to produce Concentrated Aroma. The Concentrated Aroma, 1.2 parts, is mixed with the Concentrated Extract, 8 parts, to produce 9.2 parts of a solution having 35% solids, which is spray dried as described in Example 1 to produce 3.25 parts of free-flowing pure tea powder. The mixture of Concentrated Extract and Concentrated Aroma, or the powdered tea, may be reconstituted with water to a beverage strength solution having flavor and aroma comparable to that of a freshly prepared infusion of tea leaves.

Although specific embodiments of the invention have been described herein, it is intended that the invention not be limited thereto but be construed so as to cover all modifications and equivalents within the scope of the invention.

We claim:

1. In the method of making a tea product from an aqueous extract of tea leaves said extract containing at least about 3% by weight of dissolved tea solids by removing water from said extract, the improvement which comprises continuously distilling from said extract about 5 to 30% thereof as a dilute aroma in an evaporator under a vacuum such that the temperature of evaporation is not greater than about 150° F. so that the quality of the tea flavor is preserved substantially unchanged, continuously withdrawing the remaining 70 to 95% of extract from said evaporator as dearomatized extract and removing more water therefrom to produce concentrated extract, condensing the dilute aroma vapors and continuously feeding the dilute aroma to an aroma fractionating column at an intermediate point, fractionating said aroma in said column at a pressure at least as high as about atmospheric pressure while supplying heat to the base of the column sufficient to strip aroma from fluid flowing down the column and force it out the top of the column as vapor, condensing said vapor and returning the major portion thereof to the top of the fractionating column as reflux so as to maintain a high concentration of aroma in the condensate, and removing a minor portion of said condensate as concentrated aroma and combining said concentrated aroma with said concentrated extract.

2. In the method of making a tea product from an aqueous extract of tea leaves by removing water from said extract, the improvement which comprises continuously distilling from said extract a dilute aroma in an evaporator under vacuum and at a temperature corresponding with said vacuum at which the quality of the tea flavor is preserved substantially unchanged, continuously withdrawing dearomatized extract from said evaporator, intermittently connecting said evaporator with a vacuum source when the vacuum in the evaporator decreases below the desired vacuum and disconnecting said evaporator from said vacuum source when the desired vacuum has been attained, thereby to minimize escape of aromatic ingredients in the extract to the vacuum source.

3. The method according to claim 1 in which the extract fed to the evaporator has been deaerated to minimize the flow of noncondensible gases to said vacuum source and the time during which said evaporator is connected to said vacuum source, further to minimize the escape of aromatic ingredients to the vacuum source.

4. In the method of making a tea product by extracting tea leaves with an aqueous fluid to produce an extract thereof containing at least about 3% by weight of dissolved tea solids and removing water from said extract, the improvement which comprises continuously distilling a dilute aroma from said extract in an evaporator under a vacuum such that the temperature of evaporation is not greater than about 150° F. so that the quality of the tea flavor is substantially preserved unchanged, continuously withdrawing the remaining unevaporated extract from said evaporator as dearomatized extract, distilling more water from said dearomatized extract to produce a concentrated extract and an aqueous distillate, condensing said aqueous distillate, condensing the dilute aroma vapors and continuously feeding them at an intermediate point of an aroma fractionating column, fractionating said aroma in said column while supplying heat to the base of the column sufficient to strip aroma and noncondensible gases from the liquid flowing down the column and force them out the top of the column as vapor, withdrawing dearomatized and deaerated bottoms from the base of the column, condensing said vapor and returning the major portion thereof to the top of the fractionating column as reflux so as to maintain a high concentration of aroma in the condensate, removing a minor portion of said condensate as concentrated aroma and combining said concentrated aroma with said concentrated extract, and recycling at least a portion of said condensed aqueous distillate from the concentration of the extract and said fractionating column bottoms to the extractor and using said recycled material to extract additional quantities of tea leaves.

5. In the method of making a tea product by extracting tea leaves with an aqueous fluid to produce an extract thereof containing at least about 3% by weight of dissolved tea solids and removing water from said extract, the improvement which comprises continuously distilling a dilute aroma from said extract in an evaporator under vacuum such that the temperature of evaporation is not greater than 150° F. so that the quality of the tea flavor is substantially preserved unchanged continuously, withdrawing the remaining unevaporated extract from the evaporator as dearomatized extract, intermittently connecting said evaporator with a vacuum source when the vacuum in the evaporator decreases below the desired vacuum and disconnecting said evaporator from said vacuum source when the desired vacuum has been attained, thereby to minimize the escape of desirable aromatic ingredients into the vacuum source, evaporating more water from said dearomatized extract to produce a concentrated extract and vapor and condensing said vapor to produce concentrated condensate, condensing the dilute aroma vapors and continuously feeding them at an intermediate point of an aroma fractionating column, fractionating said aroma in said column while supplying heat to the base of the column sufficient to strip aroma and noncondensible gases from the liquid flowing down the column and force them out the top of the column as vapor, withdrawing dearomatized and deaerated bottoms from the base of the column, condensing said vapor from the fractionating column and returning the major portion thereof to the top of the fractionating column as reflux so as to maintain a high concentration of aroma in the condensate, removing a minor portion of said condensate as concentrated aroma and combining said concentrated aroma with said concentrated extract, and recycling at least a portion of said concentrator condensate and said fractionating column bottoms to the extractor and using said recycled material to extract additional quantities of tea leaves.

6. The method of claim 1 in which the final product is spray-dried to produce a tea powder.

7. The method of claim 4 in which the final product is spray-dried to produce a tea powder.

8. The method of claim 1 in which the aqueous extract of the tea leaves is pre-heated in a down-flow tubular heater prior to separating the vapor from the liquid in the vacuum evaporator, and the heating and vacuum are controlled to evaporate 5 to 15% of the aqueous extract as dilute aroma.

9. The method of claim 8 in which the amount of concentrated aroma is about ½ to 1% of the amount of extract fed to the vacuum evaporator.

10. The method of claim 9 in which the final product is spray-dried to produce a tea powder.

References Cited in the file of this patent

UNITED STATES PATENTS

| 2,098,961 | Fronmuller | Nov. 16, 1937 |
| 2,457,315 | Milleville | Dec. 28, 1948 |
| 2,513,813 | Milleville | July 4, 1950 |
| 2,542,119 | Cole | Feb. 20, 1951 |
| 2,563,233 | Gilmont | Aug. 7, 1951 |
| 2,639,237 | Johnston | May 19, 1953 |

UNITED STATES PATENT OFFICE
CERTIFICATE OF CORRECTION

Patent No. 2,927,860                             March 8, 1960

Edward Seltzer et al.

It is hereby certified that error appears in the printed specification of the above numbered patent requiring correction and that the said Letters Patent should read as corrected below.

Column 4, line 15, for "described" read -- desired --; column 6, line 62, for "fluid" read -- liquid --; column 7, line 10, for the claim reference numeral "1" read -- 2 --; column 8, list of References Cited, after line 55, insert:

FOREIGN PATENTS 22,590    Great Britain---------------1898

Signed and sealed this 23rd day of August 1960.

(SEAL)
Attest:

KARL H. AXLINE
Attesting Officer

ROBERT C. WATSON
Commissioner of Patents